(12) United States Patent
Wilhide

(10) Patent No.: US 10,153,693 B2
(45) Date of Patent: Dec. 11, 2018

(54) DC-DC CONVERTER INCLUDING DYNAMICALLY ADJUSTED DUTY CYCLE LIMIT

(71) Applicant: Hamilton Sundstrand Corporation, Charlotte, NC (US)

(72) Inventor: Matthew L. Wilhide, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 176 days.

(21) Appl. No.: 15/014,453

(22) Filed: Feb. 3, 2016

(65) Prior Publication Data
US 2017/0222549 A1 Aug. 3, 2017

(51) Int. Cl.
*H02M 1/14* (2006.01)
*H02M 3/156* (2006.01)
*H02M 1/00* (2006.01)

(52) U.S. Cl.
CPC ............. *H02M 3/156* (2013.01); *H02M 1/14* (2013.01); *B64D 2221/00* (2013.01); *H02M 2001/0022* (2013.01); *H02M 2001/0032* (2013.01); *Y02B 70/16* (2013.01)

(58) Field of Classification Search
CPC ........................... H02M 3/156; B64D 2221/00
USPC ........................................................ 307/9.1
See application file for complete search history.

(56) References Cited

U.S. PATENT DOCUMENTS

| | | | |
|---|---|---|---|
| 4,578,630 A | 3/1986 | Grosch | |
| 6,081,104 A * | 6/2000 | Kern | H02J 9/065 320/101 |
| 7,365,525 B2 | 4/2008 | Zhou et al. | |
| 7,605,574 B2 | 10/2009 | Dearn et al. | |
| 8,278,895 B2 | 10/2012 | Gardner et al. | |
| 8,723,490 B2 | 5/2014 | Moussaoui et al. | |
| 9,099,922 B2 | 8/2015 | Toosky et al. | |

(Continued)

OTHER PUBLICATIONS

Hauke, Brigitte, D., Basic Calculation of a Boost Converter's Power Stage, Jan. 31, 2014, pp. 1-9, XP055375391, Retrieved from the Internet: URL: http://www.ti.com/lit/an/slva372c/slva372c.pdf [retrieved on May 23, 2017].

(Continued)

*Primary Examiner* — Dinh T Le

(74) *Attorney, Agent, or Firm* — Carlson, Gaskey & Olds, P.C.

(57) ABSTRACT

A DC-DC converter including a DC input and a DC output, at least one switch connecting the DC input to a converter inductor, the converter inductor connecting the at least one switch to the DC output, a controller configured to control an open/closed state of the at least one switch, a first voltage sensor connected to the DC input and operable to provide a sensed voltage to the controller, a second voltage sensor connected to the DC output and operable to provide a sensed voltage to the controller. The controller includes a processor and a memory, the memory storing instructions for causing the controller to dynamically adjust a duty cycle limit of the DC-DC converter to be equal to one minus a numerator divided by a denominator, where the numerator is the instantaneous input voltage minus a compensation factor and where the denominator is the instantaneous output voltage.

19 Claims, 3 Drawing Sheets

(56) References Cited

U.S. PATENT DOCUMENTS

| | | | |
|---|---|---|---|
| 9,124,824 B2 * | 9/2015 | Smilansky | H04N 5/3355 |
| 9,146,571 B2 | 9/2015 | Trautmann | |
| 2013/0076330 A1 * | 3/2013 | Hayashi | H02M 3/156 |
| | | | 323/311 |
| 2015/0146458 A1 | 5/2015 | Lim | |

OTHER PUBLICATIONS

European Search Report for Application No. 17154355.6 dated May 31, 2017.

* cited by examiner

DC-DC CONVERTER INCLUDING DYNAMICALLY ADJUSTED DUTY CYCLE LIMIT

STATEMENT REGARDING FEDERALLY SPONSORED RESEARCH OR DEVELOPMENT

This invention was made with government support under contract number FA 8650-14-C-2446 awarded by the United States Air Force. The government has certain rights in the invention.

TECHNICAL FIELD

The present disclosure relates generally to DC-DC converter control, and more specifically to a duty cycle limit control for a DC-DC converter.

BACKGROUND

DC power applications, such as aircraft power distribution systems, frequently include DC power sources at a voltage different from the voltage at which the power is to be distributed. One such example is the inclusion of a battery, or other stored energy component, in an aircraft. In order to allow the DC power source to provide power to the power distribution system at the proper voltage, a DC-DC power converter is utilized to adjust the voltage of the power provided.

By way of example, in an aircraft DC power distribution system, a battery, supercapacitor, or other similar power source connected to a distribution bus, is typically at a lower voltage than the voltage of the distribution bus. In order to increase the voltage of the battery to the level of the DC power distribution system, a boost converter is positioned between the battery and the distribution bus. Alternatively, if the voltage of the battery, or other power source is above the voltage level of the DC power distribution system, a buck converter is utilized to lower the DC voltage output from the battery. In other examples, the voltage of the power distribution system can vary, depending on the needs of the connected loads. In such an example, a buck/boost converter can be utilized to connect a DC power source, such as a battery or ultra-capacitor, to the DC power distribution system. In such an example, the battery or ultra-capacitor provides a power source/absorption for fast power transients, thereby allowing the generator to be sized to source the average load rather than the peak load.

SUMMARY OF THE INVENTION

An exemplary method for controlling an electrical power converter includes determining an instantaneous input voltage of the converter using an input voltage sensor, determining an instantaneous output voltage of the converter using an output voltage sensor, and dynamically adjusting a duty cycle limit of the converter to be equal to one minus a numerator divided by a denominator, where the numerator is the instantaneous input voltage minus a compensation factor and where the denominator is the instantaneous output voltage.

In another example of the above described exemplary method for controlling an electrical power converter the compensation factor is at least partially based on a rate of change of current commanded through a converter inductor by a controller.

In another example of any of the above described exemplary methods for controlling an electrical power converter the compensation factor is a derivative with respect to time of an instantaneous commanded current multiplied by a compensation constant.

In another example of any of the above described exemplary methods for controlling an electrical power converter the compensation constant is at least partially determined by an inductance value of an inductor of the electrical power converter.

In another example of any of the above described exemplary methods for controlling an electrical power converter the compensation constant is equal to the inductance value of the inductor of the electrical power converter.

In another example of any of the above described exemplary methods for controlling an electrical power converter the electrical power converter is a boost converter.

In another example of any of the above described exemplary methods for controlling an electrical power converter the electrical power converter is a buck converter.

In another example of any of the above described exemplary methods for controlling an electrical power converter the electrical power converter is a buck/boost converter.

Another example of any of the above described exemplary methods for controlling an electrical power converter further includes determining a desired instantaneous duty cycle limit of the converter using a controller including a memory and a processor.

Another example of any of the above described exemplary methods for controlling an electrical power converter includes dynamically adjusting the duty cycle limit of the converter includes applying the instantaneous Duty Cycle Limit to a pulse width modulation (PWM) control signal output from the controller.

In one exemplary embodiment a DC-DC converter includes a DC input and a DC output, at least one switch connecting the DC input to a converter inductor, the converter inductor connecting the at least one switch to the DC output, a controller configured to control an open/closed state of the at least one switch, a first voltage sensor connected to the DC input and operable to provide a sensed voltage to the controller, a second voltage sensor connected to the DC output and operable to provide a sensed voltage to the controller. The controller includes a processor and a memory, the memory storing instructions for causing the controller to dynamically adjust a duty cycle limit of the DC-DC converter to be equal to one minus a numerator divided by a denominator, where the numerator is the instantaneous input voltage minus a compensation factor and where the denominator is the instantaneous output voltage.

In another exemplary embodiment of the above described DC-DC converter the compensation factor is at least partially based on a rate of change of current commanded through the converter inductor by a controller.

In another exemplary embodiment of any of the above described DC-DC converters the compensation factor is a derivative with respect to time of an instantaneous commanded current multiplied by a compensation constant, and wherein the instantaneous commanded current is the current commanded through the converter inductor.

In another exemplary embodiment of any of the above described DC-DC converters the compensation constant is at least partially determined by an inductance value of the converter inductor.

In another exemplary embodiment of any of the above described DC-DC converters the compensation constant is equal to the inductance value of the converter inductor.

In another exemplary embodiment of any of the above described DC-DC converters the DC-DC converter connects a battery to an aircraft power distribution system.

These and other features of the present invention can be best understood from the following specification and drawings, the following of which is a brief description.

DETAILED DESCRIPTION OF AN EMBODIMENT

Figure 1:
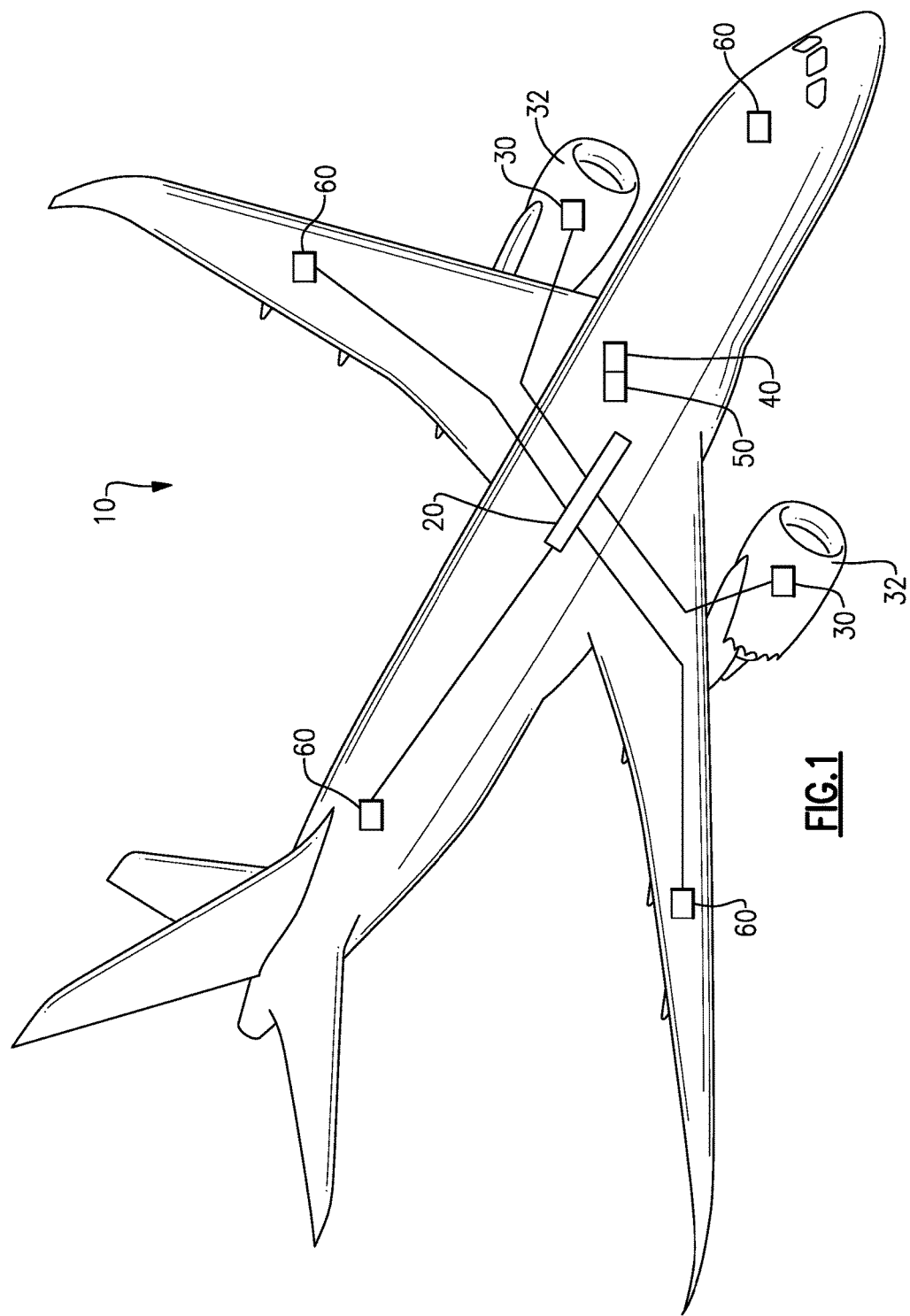
FIG. 1 schematically illustrates an aircraft power distribution system.

FIG. 1 schematically illustrates an aircraft power distribution system 10 including a power distribution bus 20. The power distribution bus 20 receives power from electrical generators 30 within each of the engines 32. The power generated within the engines 32 is typically three phase AC power, and can be converted to DC power prior to provision to the DC power distribution system 20 via any standard power conversion means.

Also supplying power to the DC power distribution bus 20 is a DC power source 40, such as a battery. In order to scale the voltage provided from the DC power source 40 to the voltage of the DC power bus 20, the DC power source 40 is connected to the DC power bus 20 via a DC-DC converter 50, such as a buck/boost converter. In alternative examples, where it is known that the voltage of the DC power source 40 will always be at a higher voltage than a voltage of the DC power distribution bus 20, a buck converter can be utilized as the DC-DC converter 50. Alternatively, when it is known that the voltage of the DC power source 40 will always be lower than the voltage of the DC power bus 20, a boost converter can be utilized as the DC-DC converter 50.

DC-DC converters, such as the DC-DC converter 50 of FIG. 1, operate via pulse width modulation (PWM) control, with a duty cycle (percentage of the time in which the converter is on) of the DC-DC converter 50 being controlled by a converter controller. In some examples, the converter controller is a component of the DC-DC converter 50 itself. In alternative examples, the converter controller can be a multi-purpose controller operable to control multiple distinct systems within the power distribution system 10. The duty cycle is maintained by the controller below a duty cycle limit. The duty cycle limit is the maximum percentage of the time that the DC-DC converter 50 can be on in a given angle.

Figure 2:
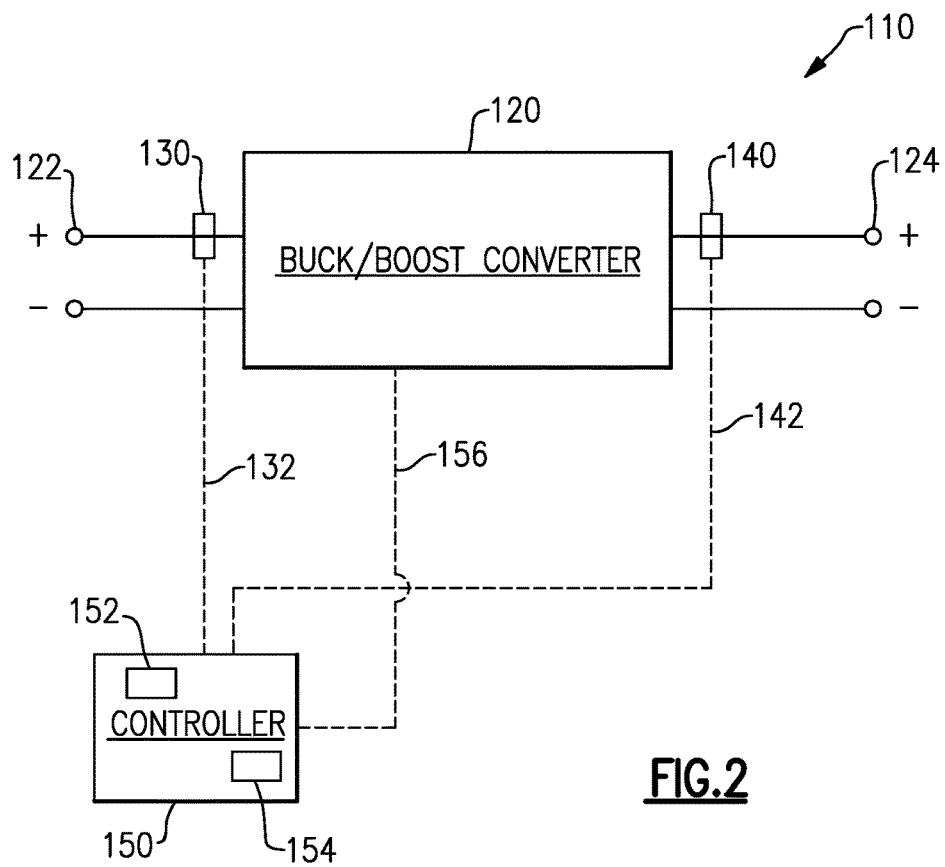
FIG. 2 schematically illustrates a DC-DC converter system for an aircraft power distribution system.

With continued reference to FIG. 1, FIG. 2 schematically illustrates an exemplary DC-DC converter system 110 for an aircraft power distribution system, such as the aircraft power distribution system 10 of FIG. 1. The DC-DC converter system 110 includes a buck/boost converter 120 with a DC input voltage 122 and a DC output voltage 124. The DC input voltage (Vin) is read by a voltage sensor 130, which is connected to a controller 150 via a sensor line 132. Similarly, the DC output voltage (Vout) is read by a voltage sensor 140, which is connected to the controller 150 via a sensor line 142.

The controller 150 includes a processor 152 and a memory 154. The memory 154 stores instructions that are configured to cause the processor to evaluate the operations and parameters of the DC-DC converter 120, and provide a corresponding PWM control signal 156 to be output from the controller 150 to the DC-DC converter 120.

Figure 3:
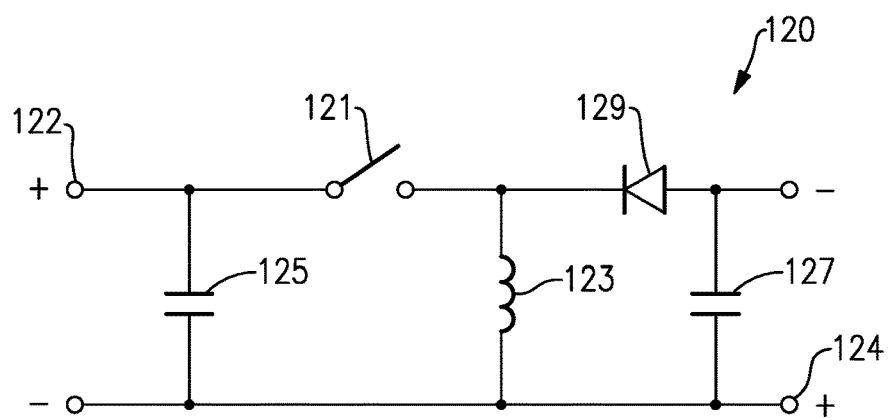
FIG. 3 schematically illustrates one exemplary buck/boost DC-DC converter topology.
Figure 4:
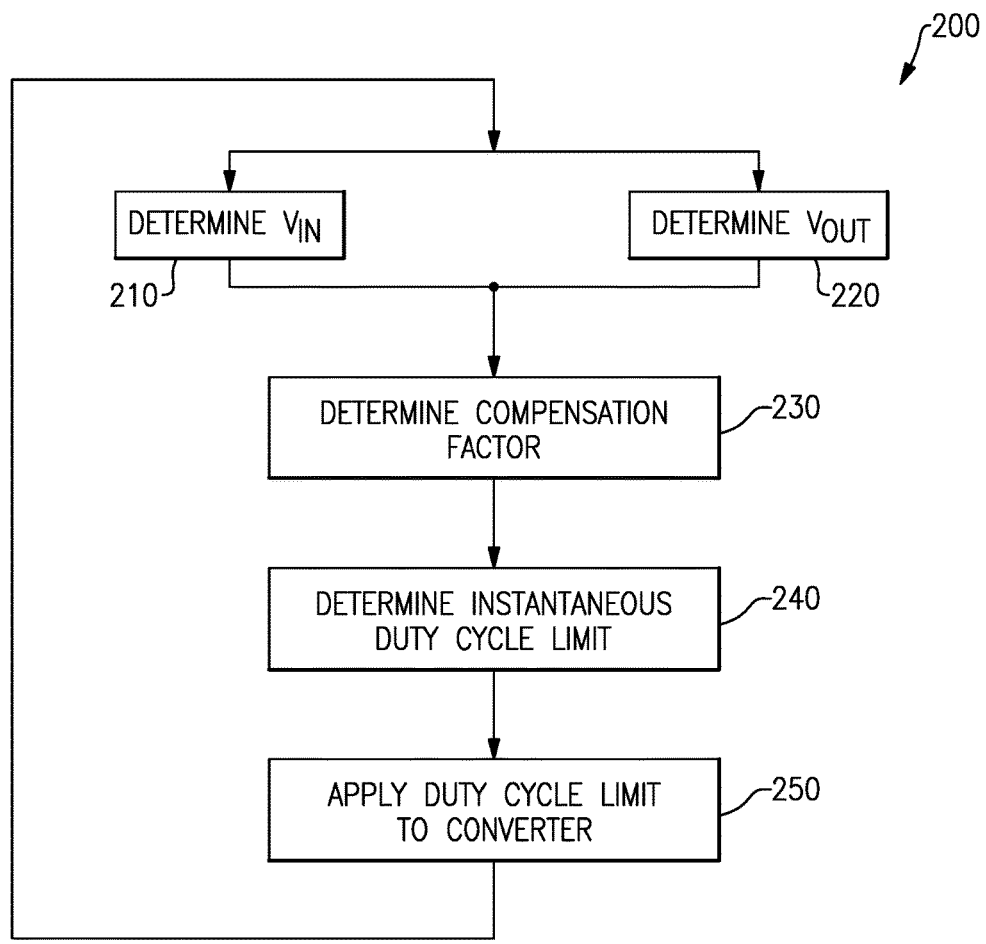
FIG. 4 schematically illustrates a method for dynamically controlling a duty cycle limit of a DC-DC converter.

With continued reference to FIGS. 1 and 2, FIG. 3 schematically illustrates an exemplary DC-DC converter 120 for inclusion in the DC-DC converter system 110 of FIG. 2. One of skill in the art, having the benefit of this disclosure will understand that the DC-DC converter 120 topology illustrated in FIG. 3 is exemplary in nature, and alternative DC-DC converter topologies can be utilized in place of, or in addition to, the illustrated example topology.

The input voltage 122 is connected to a DC power source, such as the DC power source 40 illustrated in FIG. 1. A capacitor 125 connects the input voltage to an output voltage 124 of the DC-DC converter 120. A switch 121, such as a transistor, is configured in line with the input voltage 122, and is operated by the controller 150 (see FIG. 2). The PWM signal output by the controller 150 controls the open/closed state of the switch 121. A converter inductor 123 connects an output of the switch 121 to the output voltage 124. The PWM control signal and operations of the switch 121 are utilized to control the current through the converter inductor 123. The specific current desired through the converter inductor 123 in order to achieve a desired output voltage from the DC-DC converter 120 is referred to as a commanded current.

A backflow prevention diode 129 is connected to the output of the switch 121 and prevents back flow of current through the switch when the DC-DC converter 120 is on. A capacitor 127 connects the backflow prevention diode 129 to the output voltage 124. The output voltage 124, in turn, is connected to the DC power distribution bus 20 (see FIG. 1).

With reference now to FIGS. 1-3, while operating the converter 120 in a boost mode with a light load, excess voltage ripple can occur on the output voltage 124 of the converter 120. As the output voltage 124 of the converter 120 is connected to the DC power distribution bus 20, the voltage ripple is passed to the DC power distribution bus 20, and can negatively impact the overall DC power distribution system 10.

The aforementioned ripple voltage on the output voltage 140 of the DC-DC converter 120 arises, at least in part, due to an improper application of the duty cycle limit to the converter by a controller. The duty cycle limit is the maximum percentage of "on time" that the controller 150 can command the DC-DC converter to be on in a given cycle. In other words, the duty cycle limit is the maximum duty cycle at which the DC-DC converter 120 can be operated.

In order to reduce the voltage ripple, the controller 150 implements an inverted peak-valley control algorithm to regulate current through the converter inductor 123. With an inverted peak-valley control algorithm, the switch is turned ON once the actual current is less than the commanded current and the remaining time in the PWM cycle is below the duty cycle limit. If the duty cycle limit is set incorrectly, the current may drop to zero during a PWM cycle. If this occurs, the control algorithm will turn the switch ON as soon as the PWM clock reaches the duty cycle limit. This results in the switch remaining ON for the entire next cycle. The switch remaining on, in turn, drives more current than required for a light load and so the converter remains OFF for several cycles as the current decays back to zero. Once it becomes time to enable the switch again, the converter 120 will begin a cyclic behavior of a single cycle ON followed by multiple cycles OFF. This cyclic behavior leads to voltage ripple on the bus.

In order to offset this, the duty cycle limit can be dynamically adjusted by the controller 150 according to the following equation: Duty Cycle Limit=1−(Vin/Vout), where Vin is the voltage at the voltage input 122 and Vout is the voltage at the voltage output 124. Absent further correction factors within the dynamic adjustment, however, the voltage output 124 has a slow response to fast transients as the duty cycle limit also limits the available input voltage utilized to push current through the converter inductor 123.

To increase the response speed, a compensation factor is added to the equation, resulting in the duty cycle limit being equal to 1−((Vin−CF)/Vout), where Vin is the voltage at the voltage input 122, Vout is the voltage at the voltage output 124, and CF is the compensation factor. The value of the compensation factor is based on a constant and on the instantaneous rate of change of the current commanded through the converter inductor 123. This compensation factor can be represented as K*ΔIcmd/Δt, where K is a constant value, ΔIcmd is a change in the commanded current through the converter inductor 123, and Δt is a change in time.

In some examples, the constant value K is determined partially based on the static inductance value of the converter inductor 123. In other examples, the constant value K is equal to the inductance value of the converter inductor 123.

Implementation of the above duty cycle limit reduces the ripple on the output voltage of the DC-DC converter 120 while the converter is operating at low loads. This further improves the power quality of the output voltage of the converter, reduces stress on hardware components, and reduces audible noise of the DC-DC power converter 120.

With continued reference to FIGS. 1-3, FIG. 4 schematically illustrates an exemplary method 200 by which the dynamic adjustment of the duty cycle limit is achieved within the controller 150. Initially, the input voltage 122 (Vin) and the output voltage 124 (Vout) of the DC-DC converter 120 are simultaneously, or approximately simultaneously, determined by the controller 150 in a "Determine Vin" step 210 and a "Determine Vout" step 220. The input voltage 122 and the output voltage 124 are read by the voltage sensors 130, 140, and are provided to the controller 150 via the sensor lines 132, 142 as described above.

The controller 150 then determines an instantaneous compensation factor in a "Determine Compensation Factor" step 230. The controller 150 controls the desired current being commanded through the converter inductor 123, and ΔIcmd/Δt can be determined using known mathematical techniques based on the commanded current. The inductance value of the converter inductor 123 is known during manufacture and can be stored within the memory 154 of the controller 150.

Once the compensation factor has been determined, the controller determines an instantaneous duty cycle limit in a "Determine Instantaneous Duty Cycle Limit" step 240. As described above, the instantaneous duty cycle limit is equal to 1−((Vin−CF)/Vout), where Vin is the voltage at the voltage input 122, Vout is the voltage at the voltage output 124, and CF is the compensation factor. The controller 150, then dynamically updates the duty cycle limit within the controller 150 to be the newly determined duty cycle limit in an "Apply Duty Cycle Limit to Converter" step 250. The duty cycle limit applies to the PWM duty cycle used to control switching of the converter switch 121.

After applying the new duty cycle limit, the controller 150 re-iterates the process. In this way, the controller 150 is configured to continuously, and dynamically, update the duty cycle limit within the controller 150 based on existing actual operational parameters.

While described above as being applied to DC-DC converters in an aircraft power distribution system, one of skill in the art will recognize that the dynamic adjustment of the duty cycle limit according to the above described system and method can be applied to any DC-DC converter system, and is not limited to a buck/boost converter or an aircraft power distribution system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for controlling an electrical power converter comprising:
    determining an instantaneous input voltage of a converter using an input voltage sensor;
    determining an instantaneous output voltage of the converter using an output voltage sensor; and
    dynamically adjusting a duty cycle limit of the converter to be equal to one minus a numerator divided by a denominator, where the numerator is the instantaneous input voltage minus a compensation factor and where the denominator is the instantaneous output voltage thereby to reduce ripples in the instantaneous output voltage.

2. The method of claim 1, wherein the compensation factor is at least partially based on a rate of change of current commanded through a converter inductor by a controller.

3. The method of claim 1, wherein the compensation factor is a derivative with respect to time of an instantaneous commanded current multiplied by a compensation constant.

4. The method of claim 3, where the compensation constant is at least partially determined by an inductance value of an inductor of the electrical power converter.

5. The method of claim 4, wherein the compensation constant is equal to the inductance value of the inductor of the electrical power converter.

6. The method of claim 1, wherein the electrical power converter is a boost converter.

7. The method of claim 1, wherein the electrical power converter is a buck converter.

8. The method of claim 1, wherein the electrical power converter is a buck/boost converter.

9. The method of claim 1, further comprising determining a desired instantaneous duty cycle limit of the converter using a controller including a memory and a processor.

10. The method of claim 9, wherein dynamically adjusting the duty cycle limit of the converter includes applying the instantaneous Duty Cycle Limit to a pulse width modulation (PWM) control signal output from the controller.

11. The method of claim 1, wherein dynamically adjusting the duty cycle limit of the converter to be equal to one minus the numerator divided by the denominator, where the numerator is the instantaneous input voltage minus the compensation factor and where the denominator is the instantaneous output voltage comprises setting the compensation factor to be based on a product of a predetermined constant and an instantaneous rate of change of a current commanded through a converter inductor.

12. The method of claim 11, wherein the constant is at least partially based on a static inductance value of the converter inductor.

13. The method of claim 11, wherein the constant is equal to the static inductance value of the converter inductor.

14. A DC-DC converter comprising:
a DC input and a DC output;
at least one switch connecting said DC input to a converter inductor, the converter inductor connecting said at least one switch to said DC output;
a controller configured to control an open/closed state of said at least one switch;
a first voltage sensor connected to said DC input and operable to provide a sensed voltage to said controller;
a second voltage sensor connected to said DC output and operable to provide a sensed voltage to said controller; and
wherein said controller comprises a processor and a memory, said memory storing instructions for causing said controller to dynamically adjust a duty cycle limit of the DC-DC converter to be equal to one minus a numerator divided by a denominator, where the numerator is the instantaneous input voltage minus a compensation factor and where the denominator is the instantaneous output voltage thereby to reduce ripples in the instantaneous output voltage.

15. The DC-DC converter of claim 14, wherein the compensation factor is at least partially based on a rate of change of current commanded through the converter inductor by a controller.

16. The DC-DC converter of claim 14, wherein the compensation factor is a derivative with respect to time of an instantaneous commanded current multiplied by a compensation constant, and wherein the instantaneous commanded current is the current commanded through the converter inductor.

17. The DC-DC converter of claim 16, where the compensation constant is at least partially determined by an inductance value of the converter inductor.

18. The DC-DC converter of claim 17, wherein the compensation constant is equal to the inductance value of the converter inductor.

19. The DC-DC converter of claim 14, wherein the DC-DC converter connects a battery to an aircraft power distribution system.

* * * * *